United States Patent Office 2,753,017
Patented July 3, 1956

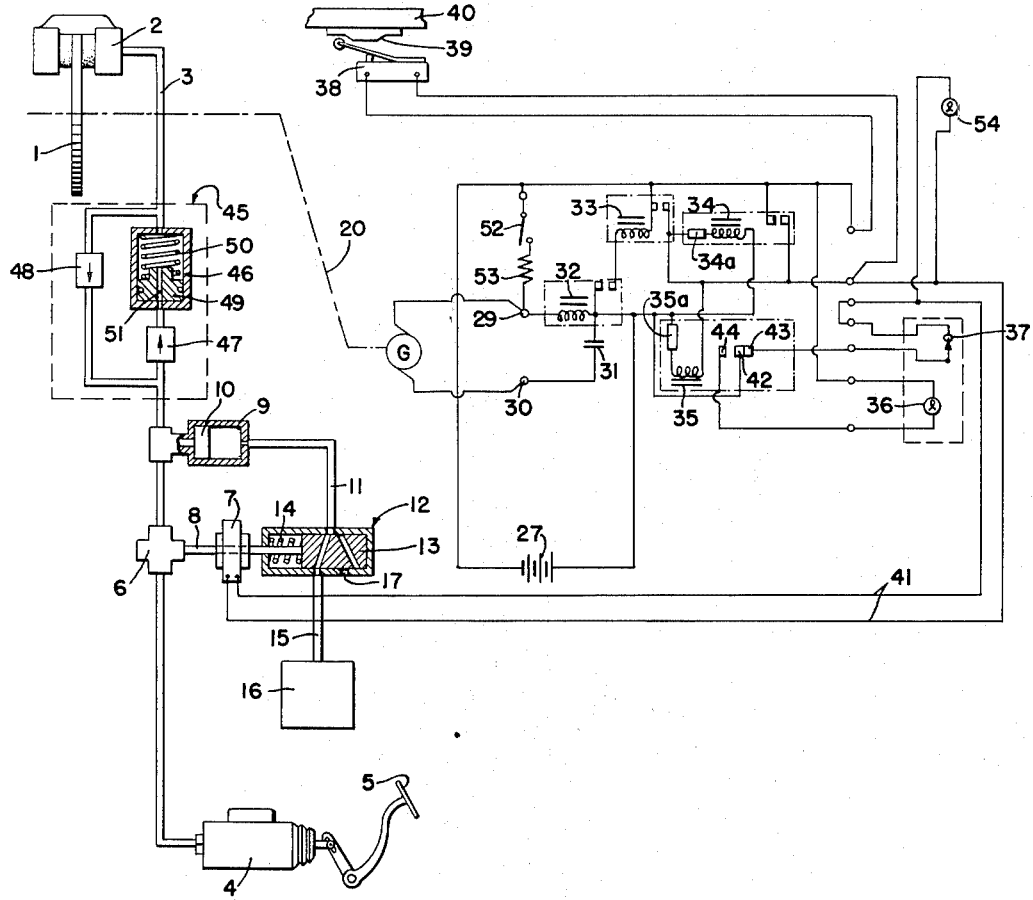

2,753,017

ANTI-SKID MECHANISM FOR MASTER CYLINDER OPERATED BRAKE

Mark I. Curl, Cuyahoga Falls, and Robert J. Lammertse, Akron, Ohio, assignors, by mesne assignments, to The Goodyear Tire & Rubber Company, a corporation of Ohio Application September 28, 1951, Serial No. 248,756

11 Claims. (Cl. 188—181)

This invention relates to anti-skid mechanisms for use with hydraulic brakes, and, more particularly, is concerned with such mechanisms for use with master cylinder operated brakes.

It has been proposed heretofore to provide mechanisms in association with railway or other vehicle brake mechanisms for automatically preventing skidding of the vehicle wheels when braked, such mechanisms being adapted to eliminate excessive wear in one spot on a vehicle wheel, and to improve overall brake efficiency regardless of the surface friction conditions between the vehicle wheel and the surface on which the wheel rolls. The greatest amount of work on this subject has been done in conjunction with railroad wheels, and there is now a demand to convert known principles of railroad wheel anti-skid mechanisms to use with other vehicles, for example, to braked airplane wheels. However, conversions of the indicated type are not readily achieved for the reason that space and weight requirements on airplane wheels and brakes, and on anti-skid mechanisms therefor, are usually much more severe than in the case of railroad wheels. Furthermore, the energy-absorbing characteristics of an airplane wheel brake are usually very high which further complicates the problem.

Moreover, many airplane brakes are actuated from master cylinders which are manually operated, and conventional practices in association with railroad wheel anti-skid mechanisms of allowing braking fluid to escape from the system during the release of brake pressure cannot be utilized in a manually operated master cylinder brake combination because of the undesirable loss of pedal pressure. It is the general object of this invention to avoid and overcome the foregoing and other difficulties of and objection to known anti-skid mechanisms and systems by the provision of an improved relatively inexpensive, light weight, relatively small space-occupying mechanism combined with the manually operated master cylinder brake system to effect smooth and highly efficient anti-skid brake operation.

Another object of the invention is to provide an anti-skid mechanism in association with a master cylinder brake combination in which braking pressure is released without changing the position of the piston in the master cylinder and without loss of braking fluid.

Another object of the invention is the provision of anti-skid mechanism in a master cylinder braking system in which the braking fluid is stored in a storage cylinder upon the release of brake pressure, but with the fluid being reintroduced into the braking system from the storage cylinder upon reapplication of the braking pressure.

Another object of the invention is to provide anti-skid mechanism in which the triggering means for protecting the commencement of a skidding action is reduced in size and weight over known mechanisms, but with the triggering mechanism functioning in a highly reliable and efficient manner over extended periods of time with a minimum of maintenance cost, or requirements.

Another object of the invention is the provision of mechanism of the type described including a manually operated safety switch for disconnecting the automatic anti-skid mechanism instantaneously and at any time from the brake assembly should this become desirable.

Another object of the invention is to provide means in association with the anti-skid mechanism when utilized in conjunction with an airplane so that the airplane brake cannot be operated until the airplane wheels after landing come up to the speed of the airplane or to the speed sufficient to activate the anti-skid equipment.

Another object of the invention is to provide an anti-skid mechanism of the type described wherein the off-on cycle of brake pressure is considerably reduced in frequency and duration.

The foregoing objects of the invention, and other objects which will become apparent as the description proceeds, are achieved by the provision, in combination, of a rotary element, a hydraulic brake for braking the element, and a manually-operated master cylinder connected by a conduit to the brake. A two-way valve is positioned in the conduit for opening or closing the conduit, and a storage cylinder is connected in the conduit between the two-way valve and the brake. The storage cylinder has a piston therein and a three-way valve is connected to the storage cylinder at its end remote from the conduit. The three-way valve is adapted to connect to a hydraulic accumulator or to an exhaust, and means inter-connect the two-way valve and the three-way valve so that when the two-way valve is opened, the three-way valve is connected to exhaust. Completing the combination are means biasing the two-way valve to normally open position, solenoid means for moving the two-way valve to closed position, and means responsive to a change in speed of the rotary element for operating the solenoid means. The last-named means preferably takes the form of a generator driven by the rotary element, a condenser connected to the output of the generator, a relay operated by the condenser upon a sudden reduction in speed of the switch unit, and means connecting the relay to the solenoid means for effecting operation thereof. The combination may include manually-operated means for opening the switch circuit to the solenoid means, and means for maintaining the two-way valve closed until the rotary element comes up to speed.

For a better understanding of the invention, reference should be had to the accompanying drawings wherein is shown a schematic diagram of one best known embodiment of the invention.

In the drawings, the numeral 1 indicates a rotary element, for example, a brake disc adapted to be frictionally engaged and stopped from rotation by means of a hydraulic brake 2 connected by conduit 3 to a master cylinder 4 adapted to be manually operated by a foot pedal 5. Positioned in the conduit 3 is a two-way valve 6 which is normally open but which is adapted to be closed upon actuation of a solenoid 7 associated with a valve stem 8.

Likewise connected to the conduit 3 is a storage cylinder 9 having a piston 10 therein, the side of the storage cylinder 9 remote from the conduit 3 being connected by a conduit 11 to a three-way valve indicated as a whole by the numeral 12. The three-way valve 12 includes a plunger portion 13 attached to the stem 8 of the two-way valve 6 and a spring 14 biases the plunger 13 so that normally the two-way valve 6 is open and the plunger 13 of the three-way valve 12 is positioned to connect the conduit 11 to a conduit 15 which extends to an air-pressure tank or hydraulic accumulator indicated diagrammatically at 16. The plunger 13 of the three-way valve 12 includes a passageway which connects the conduit 11 with an exhaust port 17 when the solenoid 7 is actuated to move the plunger 13 to close the two-way valve 6 and to bring the port 17 into alignment with the conduit 11.

It is believed that the operation of the mechanism described so far will be understood from the foregoing description. Suffice it to say here that spring 14 normally biases valve stem 8 so that the two-way valve 6 is open, and the operation of the brake pedal 5 causes fluid under pressure to be supplied through conduit 3 to the brake 2 to apply braking force to the rotary element or brake disc 1. During this normal brake operation, conduit 15 connected to the hydraulic accumulator 16 provides fluid pressure through conduit 11 to the side of the piston 10 remote from the conduit 3 so that in effect the storage cylinder 9 is not in operation. Should the pressure applied by the brake 2 to the rotary element 1 be so great as to effect a skid or an excess of deceleration, then the solenoid 7 is operated by means to be hereinafter described, and this causes the valve stem 8 to move to the left against the biasing pressure of spring 14 to close the two-way valve 6 and to move the plunger 13 of the three-way valve 12 to the left. Movement of the plunger 13 to the left connects conduit 11 to the exhaust port 17, and the piston 10 moves to the right in the storage cylinder 9 thereby reducing the pressure in the conduit 3 and releasing the pressure of the hydraulic fluid in brake 2. Braking pressure on the rotary element 1 is thus released and skidding is prevented or reduced. Once the braking action is relieved in the manner described, the solenoid 7 is deenergized and the spring 14 reopens two-way valve 6 and moves the plunger 13 of the three-way valve 12 back to the position shown in Fig. 1 to again connect the hydraulic accumulator 16 through conduits 15 and 11 with the right hand side of piston 10 in the storage cylinder 9 to thereby return to the conduit 11 the hydraulic fluid displaced in the storage cylinder 9.

Thus, there is no loss of fluid in the conduit 3 and foot pedal pressure is maintained on pedal 5 and the braking operation is resumed under the control of the pedal 5. The pressure in the hydraulic accumulator 16 may be greater than the pressure in the conduit 3, in order to effect the operation described, or, as shown, the area of the piston 10 to the right and subject to the pressure of the fluid from the hydraulic accumulator 16 may be greater than the area of the piston 10 to the left subject to the pressure of the hydraulic fluid in the conduit 3. The result in each case is the same.

Turning now to the control of the solenoid 7, and particularly to the mechanism for effecting the energization of this solenoid upon the skidding or too rapid deceleration of the rotary member 1, the means to accomplish this operation may take any one of several forms.

The drawing shows a form of variable voltage source comprising a D. C. generator 28 which is adapted to be driven by the rotary element 1 for supplying a voltage proportional to the rotation of the rotary element. The output of the generator 28 is adapted to be connected to binding posts 29 and 30.

The schematic wiring diagram likewise includes a time constant condenser 31, a current-sensitive relay 32, a power relay 33, a slow release relay 34, having a time period of approximately 0.2 second, and a slow make relay 35 having a time constant of approximately 3.0 seconds. Also included in the circuit is a warning light 36, a manually-operated on-off switch 37, and a microswitch 38 mounted in association with a cam 39 on the landing strut 40 of the airplane. The switch 38 is normally closed by the cam unless the weight of the airplane is on the landing strut 40 in an amount to move the cam 39 to a position off of the switch 38. The solenoid 7 is connected by leads 41 into the control circuit in the manner illustrated.

The operation of the control circuit and of the soleniod 7 is as follows:

The normal rotation of the rotary element 1 produces a voltage across the binding posts 29 and 30 to effect a charging of the time constant condenser 31. Should the deceleration of the rotary element 1 become too rapid, that is with a skid developing, the voltage across the binding posts 29 and 30 drops to a point where the condenser 31 produces a discharge or back voltage sufficient to energize the current-sensitive relay 32 which causes the operation of the power relay 33 to thereby energize solenoid 7. As previously explained, operation of solenoid 7 closes the two-way valve 6 and causes the three-way valve 12 to assume a position relieving pressure from the right of the piston 10 in the storage cylinder 9 thereby allowing the piston 10 to move to the right and relieve the braking pressure in the conduit 3. The removal of the brake pressure then stops the deceleration of the rotary element 1 causing the condenser discharge to disappear as the voltage is again applied to binding posts 29 and 30 by the generator. This action opens relays 32 and 33 to deenergize the solenoid 7 and spring 14 then reopens two-way valve 6 and repositions three-way valve 12 to again supply hydraulic pressure fluid to the right hand side of piston 10 to thereby return the displaced fluid from the storage cylinder 9 to the hydraulic conduit 3. It should be understood that the two-way valve 6 shuts first and opens last so that no foot pedal travel is lost as a result of temporarily removing the brake pressure in the manner described.

In order to insure the operation of the anti-skid action, it is necessary to remove the brake pressure, or to prevent the application of the brake pressure when the wheels of the airplane first touch the ground. This is achieved by means of the slow release relay 34 and the microswitch 38 and cam 39. Box 34a connected in the relay circuit represents a copper slug positioned at the opposite end of the relay from the armature to slow the release of the relay. Specifically, when the microswitch 38 is closed, by the engagement of the cam 39 with the microswitch, the relay 34 is energized to remove the possibility of the application of brake pressure until sufficient landing load appears on the strut to move the cam 39 off of the switch 38 to thereby open the switch, open the relay 34 and deenergize the solenoid 7. This allows the rotary element 1 to come up to landing speed and to furnish the control voltage from the direct current generator 28. Inasmuch as the appearance of a considerable load on the landing strut can be very fast, the relay 34 is of the slow release type, providing approximately 0.2 seconds delay of the de-energization of the solenoid 7, i. e. until enough wheel rotation exists to provide the anti-skid circuit with the power to start functioning in the manner described.

Relay 35 is placed in the circuit so as to form a "failsafe" device. In the event that any of the relay points stick together or the microswitch 38 fails to open the brake pressure would be held off because the solenoid 7 is energized. In case the solenoid 7 remains energized longer than a desirable time interval, such as 3.0 seconds, relay 35 operates to disconnect contacts 42 and 43 and to connect contacts 44 and 42. This de-energizes the solenoid 7 and causes the warning light 36 to come on, and this condition will last until the trouble is corrected. Box 35a represents a dash pot as one way to obtain the desired delay in the action of the relay 35. The manually-operated switch 37 on the instrument panel is provided so that when the switch 37 is opened, the solenoid 7 can never be energized. In other words, opening switch 37 eliminates the anti-skid mechanism completely from the control circuit so that none of the anti-skid equipment operates, and the solenoid 7 is never energized. This leaves the brake operation under the full control of the brake pedal 5.

It is often advantageous to reduce the frequency of the cycle of brake pressure application and the total duration of the cycling and to bring the actual braking pressure to substantially the amount giving the greatest braking action without skidding. To this end, the invention includes a pressure regulator 45 contained within the outline of the dotted box. The regulator has a cylinder 46 connected at its ends in the conduit 3, one end being connected to the conduit 3 by a one-way check valve 47 opening in the direction of the arrow. A one-way check valve 48 opening in the direction shown by the arrow is connected to bypass the cylinder 46.

The cylinder 46 slidably receives a piston 49 normally urged to the end of the cylinder remote from the brake 2 by means of a compression spring 50. The piston 49 has an orifice 51 therethrough which is of a size together with the remainder of the regulator so that the regulator functions as follows:

Pressure applied to the master cylinder 4 causes a fluid pressure flow through valve 47, but not through valve 48, and causes piston 49 to move against spring 50 discharging fluid from the cylinder 46 to apply full pressure to the brake 2. When pressure is removed from the conduit 3, as by operation of storage cylinder 9, the fluid displaced from the brake 2 flows through valve 48 and valve 47 is closed. The closing of valve 47 causes the piston 49 to act as a dash pot under the return pressure of spring 50.

The rate of return of the piston 49 is constant and by proper proportioning of the regulator parts is ordinarily made to take about one-half a second.

Now if the brake pressure is reapplied by discharge of storage cylinder 9 before the piston 49 has returned to its at rest position, this reapplication of pressure causes the piston 49 to reach the end of its travel before the full brake pressure is applied to the brake 2. Thus this second pressure application does not at the brake 2 build up immediately to the pressure in the conduit 3 in front of the regulator 45.

Repeated removal and reapplication of braking pressure in the conduit 3 in front of the regulator 45 results as described in a progressively diminished brake pressure at the brake 2, a pressure which is determined by the rate of fluid flow through the orifice 51 in piston 49.

The result is a reduction of the frequency of the cycle of brake pressure release and reapplication, a rapid seeking or regulating to a level of brake pressure application which effects the maximum in braking action without skidding, and a reduction in the duration of the cycling action. The regulator also has the desirable property of causing greater pressure drops at the brake as the reapplication severity and/or frequency increases.

Also incorporated in the invention, if desired, is a check off push-button switch 52 which can connect one side of the battery 27 to binding post 29 through a resistor 53. When push-button switch 52 is closed a voltage appears across binding posts 29 and 30 which is sufficient to operate relay 32 and thus operate solenoid 7. A skid signal check light 54 connected in parallel with the solenoid 7 shows that the anti-skid system is working satisfactory. A pilot running down a check list before landing can thus check the operativeness of the anti-skid system of the airplane.

It is within the concept of our invention to use a single pole, double throw polarized relay in place of the relay 32 in the circuit as described.

It will be recognized from the foregoing that the various objects of the invention have been achieved by the provision of relatively simple, easily installed and maintained apparatus for achieving a high-efficiency, anti-skid brake operation for use with master cylinder operated brakes. The combination is characterized by no loss of pedal pressure even after repeated anti-skid operation.

While certain representative embodiments and details have been shown for the purpose of illustrating the invention, it will be apparent to those skilled in this art that various changes and modifications may be made therein without departing from the spirit or scope of the invention.

What is claimed is:

1. In combination, a rotary element, a hydraulic brake for braking the element, a foot-operated master cylinder, a conduit connecting the master cylinder and the brake, a two-way valve in the conduit for opening or closing the conduit, a storage cylinder connected to the conduit between the two-way valve and the brake, said storage cylinder having a piston therein, a hydraulic accumulator, a three-way valve connected to the storage cylinder at its end remote from the conduit and adapted to connect to the hydraulic accumulator or to exhaust, means interconnecting the two-way and three-way valves so that when the two-way valve is open the three-way valve is connected to the accumulator and when the two-way valve is closed the three-way valve is connected to exhaust, means biasing the two-way valve to normally open position, solenoid means for moving the two-way valve to closed position, a generator driven by the rotary element, a condenser connected to the output of the generator, a relay operated by the condenser upon a sudden reduction in speed of the generator, means connecting the relay to the solenoid means for effecting operation thereof, manually-operated switch means for opening the circuit to the solenoid means, and means for operating the solenoid means and maintaining the two-way valve closed until the rotary element comes up to speed.

2. In combination, a rotary element, a hydraulic brake for braking the element, a foot-operated master cylinder, a conduit connecting the master cylinder and the brake, a two-way valve in the conduit for opening or closing the conduit, a storage cylinder connected to the conduit between the two-way valve and the brake, said storage cylinder having a piston therein, a hydraulic accumulator, a three-way valve connected to the storage cylinder at its end remote from the conduit and adapted to connect to the hydraulic accumulator or to exhaust, means inter-connecting the two-way and three-way valves so that when the two-way valve is open, the three-way valve is connected to the accumulator and when the two-way valve is closed the three-way valve is connected to exhaust, means biasing the two-way valve to normally open position, solenoid means for moving the two-way valve to closed position, a generator driven by the rotary element, a condenser connected to the output of the generator, a relay operated by the condenser upon a sudden reduction in speed of the generator, means connecting the relay to the solenoid means for effecting operation thereof, and manually-operated switch means for opening the circuit to the solenoid means.

3. In combination, a rotary element, a hydraulic brake for braking the element, a foot-operated master cylinder, a conduit connecting the master cylinder and the brake, a two-way valve in the conduit for opening or closing the conduit, a storage cylinder connected to the conduit between the two-way valve and the brake, said storage cylinder having a piston therein, a hydraulic accumulator, a three-way valve connected to the storage cylinder at its end remote from the conduit and adapted to connect to the hydraulic accumulator or to exhaust, means interconnecting the two-way and three-way valves so that when the two-way valve is open the three-way valve is connected to the accumulator and when the two-way valve is closed the three-way valve is connected to exhaust, means biasing the two-way valve to normally open position, solenoid means for moving the two-way valve to close position, a generator driven by the rotary element, a condenser connected to the output of the generator, a relay operated by the condenser upon a sudden reduction in speed of the generator, and means connecting the relay to the solenoid means for effecting operation thereof.

4. In combination, a rotary element, a hydraulic brake for braking the element, a foot-operated master cylinder, a conduit connecting the master cylinder and the brake, a two-way valve in the conduit for opening or closing the conduit, a storage cylinder connected to the conduit between the two-way valve and the brake, said storage cylinder having a piston therein, a hydraulic accumulator, a three-way valve connected to the storage cylinder at its end remote from the conduit and adapted to connect to the hydraulic accumulator or to exhaust, means inter-connecting the two-way and three-way valves so that when the two-way valve is open the three-way valve is connected to the accumulator and when the two-way valve is closed the three-way valve is connected to exhaust, means biasing the two-way valve to normally open position, solenoid means for moving the two-way valve to close position, and means responsive to a change in speed of the rotary element for operating the solenoid means.

5. In combination, a rotary element, a hydraulic brake for braking the element, a foot-operated master cylinder, a conduit connecting the master cylinder and the brake, a two-way valve in the conduit for opening or closing the conduit, a storage cylinder connected to the conduit between the two-way valve and the brake, said storage cylinder having a piston therein, a hydraulic accumulator, a three-way valve connected to the storage cylinder at its end remote from the conduit and adapted to connect to the hydraulic accumulator or to exhaust, means inter-connecting the two-way and three-way valves so that when the two-way valve is open the three-way valve is connected to the accumulator and when the two-way valve is closed the three-way valve is connected to exhaust, means biasing the two-way valve to normally open position, solenoid means for moving the two-way valve to closed position, means responsive to a change in speed of the rotary element for operating the solenoid means, and a pressure regulator connected in the conduit between the storage cylinder and the brake, the regulator including a cylinder, a check valve allowing the flow of fluid to the cylinder, a check valve allowing flow of fluid back from the brake around the cylinder and first-named check valve, and a piston slidably mounted in the cylinder for movement against a compression spring and having an orifice therethrough.

6. In combination, a rotary element, a hydraulic brake for the element, a foot-operated master cylinder, a conduit connecting the brake and the master cylinder, storage means associated with the conduit, valve means for cutting off the master cylinder from the conduit and for opening the storage means to the conduit, a means for moving the valve means to connect the master cylinder and the conduit and for discharging the storage means into the conduit, a cylinder connected in the conduit between the storage means and the brake, a check valve allowing the flow of fluid to the cylinder, a check valve allowing flow of fluid back from the brake around the cylinder and first-named check valve, and a piston slidably mounted in the cylinder for movement against a compression spring and having an orifice therethrough.

7. In combination, a rotary element, a hydraulic brake for the element, a generator driven by the element, a time constant condenser connected to the output of the generator, relay means connected to the condenser and adapted to be operated upon too rapid deceleration of the rotary element, a conduit for supplying hydraulic pressure to the brake, means controlled by the relay means for removing hydraulic pressure from the brake, a cylinder connected in the conduit to the brake, a check valve allowing the flow of fluid to the cylinder, a check valve allowing flow of fluid back from the brake around the cylinder and first-named check valve, and a piston slidably mounted in the cylinder for movement against a compression spring and having an orifice therethrough.

8. In combination a rotary element, a hydraulic brake for the element, a pressure cylinder, a conduit connecting the brake and the pressure cylinder, storage means associated with the conduit, valve means for cutting off the pressure cylinder from the conduit and for opening the storage means to the conduit, and means for moving the valve means to connect the pressure cylinder and the conduit and for discharging the storage means into the conduit, a cylinder connected in the conduit between the storage means and the brake, a check valve allowing the flow of fluid to the cylinder, a check valve allowing flow of fluid back from the brake around the cylinder and first-named check valve, and a piston slidably mounted in the cylinder for movement against a compression spring and having an orifice therethrough.

9. In combination, a rotary element, a hydraulic brake for the element, a pressure cylinder, a conduit connecting the brake and pressure cylinder, and a pressure regulator connected in the conduit between the pressure cylinder and the brake, the regulator including a cylinder, a check valve allowing the flow of fluid to the cylinder, a check valve allowing flow of fluid back from the brake around the cylinder and first-named check valve, and a piston slidably mounted in the cylinder for movement against a compression spring and having an orifice therethrough.

10. In combination, a rotary element, a hydraulic brake for the element, a master cylinder, a conduit connecting the brake to the master cylinder, storage means comprising a cylinder, a piston therein dividing the cylinder into two chambers, one chamber being connected to said conduit and the other chamber being adapted to be connected to a hydraulic pressure accumulator or to an exhaust, valve means for cutting off the master cylinder from the conduit, means biasing the valve means to connect the master cylinder and the conduit, means including said hydraulic pressure accumulator responsive to the position of said valve means when connecting the master cylinder and conduit for discharging the fluid in the storage means into the conduit, and means responsive to wheel deceleration for controlling the valve means.

11. In combination, a rotary element, a hydraulic brake for the element, a master cylinder, a conduit connecting the brake and the master cylinder, a storage cylinder having a movable piston dividing it into two chambers, one of said chambers being connected to said conduit, the other chamber being adapted to be connected to a hydraulic pressure accumulator or to exhaust, valve means for cutting off the master cylinder from the conduit and for simultaneously closing said other chamber from said accumulator and opening it to exhaust for relieving pressure in said conduit, means biasing the valve means to connect the master cylinder and the conduit and simultaneously to connect said other chamber to said accumulator, and means responsive to deceleration of said rotary element for operating said valve means against said biasing means.

References Cited in the file of this patent

UNITED STATES PATENTS

| | | |
|---|---|---|
| 2,107,823 | Hallot | Feb. 8, 1938 |
| 2,402,403 | Hines | June 18, 1946 |
| 2,636,700 | Yarber et al. | Apr. 28, 1953 |

FOREIGN PATENTS

| | | |
|---|---|---|
| 382,241 | Great Britain | Oct. 20, 1932 |